US012425800B2

(12) United States Patent
Vilkamo et al.

(10) Patent No.: US 12,425,800 B2
(45) Date of Patent: Sep. 23, 2025

(54) SPATIAL AUDIO REPRESENTATION AND RENDERING

(71) Applicant: Nokia Technologies Oy, Espoo (FI)

(72) Inventors: Juha Vilkamo, Helsinki (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 206 days.

(21) Appl. No.: 17/767,265

(22) PCT Filed: Sep. 29, 2020

(86) PCT No.: PCT/FI2020/050641
§ 371 (c)(1),
(2) Date: Apr. 7, 2022

(87) PCT Pub. No.: WO2021/069794
PCT Pub. Date: Apr. 15, 2021

(65) Prior Publication Data
US 2022/0369061 A1 Nov. 17, 2022

(30) Foreign Application Priority Data
Oct. 11, 2019 (GB) ...................................... 1914716

(51) Int. Cl.
*H04S 7/00* (2006.01)
*G10L 19/08* (2013.01)

(52) U.S. Cl.
CPC .............. *H04S 7/306* (2013.01); *G10L 19/08* (2013.01); *H04S 7/304* (2013.01);
(Continued)

(58) Field of Classification Search
CPC ...... H04S 7/306; H04S 7/304; H04S 2400/01; H04S 2400/11; H04S 2400/15;
(Continued)

(56) References Cited

U.S. PATENT DOCUMENTS 7,840,019 B2 * 11/2010 Slaney .................... H04S 1/002
381/310
9,602,947 B2 * 3/2017 Oh .......................... H04S 3/008
(Continued)

FOREIGN PATENT DOCUMENTS

CN 103329576 A 9/2013
CN 110021306 A 7/2019
(Continued)

OTHER PUBLICATIONS

Southern, Alex, et al., "Boundary absorption approximation in the spatial high-frequency extrapolation method for parametric room impulse response synthesis", Apr. 2019, © Author(s) 2019, 13 pgs.

*Primary Examiner* — Xu Mei
(74) *Attorney, Agent, or Firm* — McCarter & English, LLP

(57) ABSTRACT

An apparatus including circuitry configured to: obtain a spatial audio signal including at least one audio signal and spatial metadata associated with the at least one audio signal; obtain at least one data set related to binaural rendering; obtain at least one pre-defined data set related to binaural rendering; and generate a binaural audio signal based on a combination of at least part of the at least one data set and the at least one pre-defined data set, and the spatial audio signal.

20 Claims, 9 Drawing Sheets

(52) U.S. Cl.
CPC ....... *H04S 2400/01* (2013.01); *H04S 2400/11* (2013.01); *H04S 2400/15* (2013.01); *H04S 2420/01* (2013.01)

(58) Field of Classification Search
CPC ............. H04S 2420/01; H04S 2420/07; H04S 2420/11; H04S 7/30; G10L 19/08; G10L 19/008
USPC ................................. 381/1, 17, 18, 309, 310
See application file for complete search history.

(56) References Cited

U.S. PATENT DOCUMENTS

| | | | | |
|---|---|---|---|---|
| 11,418,903 | B2 * | 8/2022 | Sim | A63F 13/424 |
| 2005/0069143 | A1 | 3/2005 | Budnikov et al. | 381/63 |
| 2018/0091920 | A1 | 3/2018 | Family | 7/304 |
| 2018/0124539 | A1 | 5/2018 | Koppens et al. | |
| 2018/0242094 | A1 | 8/2018 | Baek et al. | |
| 2019/0215637 | A1 * | 7/2019 | Lee | H04S 7/304 |

FOREIGN PATENT DOCUMENTS

| | | | |
|---|---|---|---|
| DE | 102011003450 | A1 | 8/2012 |
| JP | 2006500818 | A | 5/2006 |
| JP | 2010171785 | A | 8/2010 |
| JP | 2015019360 | A | 1/2015 |
| JP | 2017143469 | A | 8/2017 |
| JP | 2019146160 | A | 8/2019 |
| WO | WO-2014111829 | A1 | 7/2014 |
| WO | WO-2017203011 | A1 | 11/2017 |
| WO | WO-2019054559 | A1 | 3/2019 |

* cited by examiner

SPATIAL AUDIO REPRESENTATION AND RENDERING

CROSS REFERENCE TO RELATED APPLICATION

This patent application is a U.S. National Stage application of International Patent Application Number PCT/FI2020/050641 filed Sep. 29, 2020, which is hereby incorporated by reference in its entirety, and claims priority to GB 1914716.4 filed Oct. 11, 2019.

FIELD

The present application relates to apparatus and methods for spatial audio representation and rendering, but not exclusively for audio representation for an audio decoder.

BACKGROUND

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Input signals can be presented to the IVAS encoder in one of a number of supported formats (and in some allowed combinations of the formats). For example a mono audio signal (without metadata) may be encoded using an Enhanced Voice Service (EVS) encoder. Other input formats may utilize new IVAS encoding tools. One input format proposed for IVAS is the Metadata-assisted spatial audio (MASA) format, where the encoder may utilize, e.g., a combination of mono and stereo encoding tools and metadata encoding tools for efficient transmission of the format. MASA is a parametric spatial audio format suitable for spatial audio processing. Parametric spatial audio processing is a field of audio signal processing where the spatial aspect of the sound (or sound scene) is described using a set of parameters. For example, in parametric spatial audio capture from microphone arrays, it is a typical and an effective choice to estimate from the microphone array signals a set of parameters such as directions of the sound in frequency bands, and the relative energies of the directional and non-directional parts of the captured sound in frequency bands, expressed for example as a direct-to-total ratio or an ambient-to-total energy ratio in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

For example, there can be two channels (stereo) of audio signals and spatial metadata. The spatial metadata may furthermore define parameters such as: Direction index, describing a direction of arrival of the sound at a time-frequency parameter interval; level/phase differences; Direct-to-total energy ratio, describing an energy ratio for the direction index; Diffuseness; Coherences such as Spread coherence describing a spread of energy for the direction index; Diffuse-to-total energy ratio, describing an energy ratio of non-directional sound over surrounding directions; Surround coherence describing a coherence of the non-directional sound over the surrounding directions; Remainder-to-total energy ratio, describing an energy ratio of the remainder (such as microphone noise) sound energy to fulfil requirement that sum of energy ratios is 1; Distance, describing a distance of the sound originating from the direction index in meters on a logarithmic scale; covariance matrices related to a multi-channel loudspeaker signal, or any data related to these covariance matrices; other parameters guiding a specific decoder, e.g., centre prediction coefficients and one-to-two decoding coefficients (used, e.g., in MPEG Surround). Any of these parameters can be determined in frequency bands.

Listening to natural audio scenes in everyday environment is not only about sounds at particular directions. Even without background ambience, it is typical that the majority of the sound energy arriving to the ears is not from direct sounds but indirect sounds from the acoustic environment (i.e., reflections and reverberation). Based on the room effect, involving discrete reflections and reverberation, the listener auditorily perceives the source distance and room characteristics (small, big, damp, reverberant) among other features, and the room adds to the perceived feel of the audio content. In other words, the acoustic environment is an essential and perceptually relevant feature of spatial sound.

SUMMARY

There is provided according to a first aspect an apparatus comprising means configured to: obtain a spatial audio signal comprising at least one audio signal and spatial metadata associated with the at least one audio signal; obtain at least one data set related to binaural rendering; obtain at least one pre-defined data set related to binaural rendering; and generate a binaural audio signal based on a combination of at least part of the at least one data set and the at least one pre-defined data set, and the spatial audio signal.

The at least one data set related to binaural rendering may comprise at least one of: a set of binaural room impulse responses or transfer functions; a set of head related impulse responses or transfer functions; a data set based on binaural room impulse responses or transfer functions; and a data set based on head related impulse responses or transfer functions.

The at least one pre-defined data set related to binaural rendering may comprise at least one of: a set of pre-defined binaural room impulse responses or transfer functions; a set of pre-defined head related impulse responses or transfer functions; a pre-defined data set based on binaural room impulse responses or transfer functions; and a pre-defined data set based on captured head related impulse responses or transfer functions.

The means may be further configured to: divide the at least one data set into a first part and a second part, wherein the means may be configured to generate a first part combination of the first part of the at least one data set and the at least one pre-defined data set.

The means configured to generate a binaural audio signal based on a combination of at least part of the at least one data set and the at least one pre-defined data set and the spatial audio signal may be configured to generate a first part binaural audio signal based on the combination of the first part of the at least one data set and the at least one pre-defined data set and the spatial audio signal.

The means configured to generate a combination of at least part of the at least one data set and the at least one pre-defined data set may be further configured to generate a second part combination comprising one of: a combination of the second part of the at least one data set and at least part of the at least one pre-defined data set; at least part of the at least one pre-defined data set where the second part of the at least one data set is a null set; and at least part of the at least one pre-defined data set where the second part of the at least one data set is determined to substantially have an error, is noisy, or corrupted.

The means configured to generate a binaural audio signal based on the combination of at least part of the at least one data set and the at least one pre-defined data set, and the spatial audio signal may be configured to generate a second part binaural audio signal based on the second part combination and the spatial audio signal.

The means configured to generate a binaural audio signal based on the combination of at least part of the at least one data set and the at least one pre-defined data set, and the spatial audio signal may be configured to combine the first part binaural audio signal and the second part binaural audio signal.

The means configured to divide the at least one data set into a first part and a second part may be configured to: generate a first window function with a roll-off function based on an offset time from a time of determined maximum energy and a cross-over time, wherein the first window function is applied to the at least one data set to generate the first part; generate a second window function with a roll-on function based on the offset time from a time of determined maximum energy and the cross-over time, wherein the second window function is applied to the at least one data set to generate the second part.

The means may be configured to generate the combination of at least part of the at least one data set and the at least one pre-defined data set.

The means configured to generate the combination of at least part of the at least one data set and the at least one pre-defined data set may be configured to: generate an initial combined data set based on a selection of the at least one data set; determine at least one gap within the initial combined data set defined by at least one pair of adjacent elements of the initial combined data set with a directional difference greater than a determined threshold; and for each gap: identify within the at least one pre-defined data set an element of the at least one pre-defined data set with a direction which is located within the gap; and combine the identified element of the at least one pre-defined data set and the initial combined data set.

The determined threshold may comprise: an azimuth threshold; and an elevation threshold.

The combination of at least part of the at least one data set and the at least one pre-defined data set may be defined over a range of directions and wherein over the range of directions the combination comprises no directional gaps greater than a defined threshold.

The at least one part of the at least one data set may be elements of the at least one data set which are at least one of: free from substantial error; free from substantial noise; and free from substantial corruption.

The means configured to obtain a spatial audio signal comprising at least one audio signal and spatial metadata associated with the at least one audio signal may be configured to receive the spatial audio signal from a further apparatus.

The means configured to obtain at least one data set related to binaural rendering may be configured to receive the at least one data set from a further apparatus.

According to a second aspect there is provided a method comprising: obtaining a spatial audio signal comprising at least one audio signal and spatial metadata associated with the at least one audio signal; obtaining at least one data set related to binaural rendering; obtaining at least one predefined data set related to binaural rendering; and generating a binaural audio signal based on a combination of at least part of the at least one data set and the at least one pre-defined data set, and the spatial audio signal.

The at least one data set related to binaural rendering may comprise at least one of: a set of binaural room impulse responses or transfer functions; a set of head related impulse responses or transfer functions; a data set based on binaural room impulse responses or transfer functions; and a data set based on head related impulse responses or transfer functions.

The at least one pre-defined data set related to binaural rendering may comprise at least one of: a set of pre-defined binaural room impulse responses or transfer functions; a set of pre-defined head related impulse responses or transfer functions; a pre-defined data set based on binaural room impulse responses or transfer functions; and a pre-defined data set based on captured head related impulse responses or transfer functions.

The method may further comprise: dividing the at least one data set into a first part and a second part; and generating a first part combination of the first part of the at least one data set and the at least one pre-defined data set.

Generating a binaural audio signal based on a combination of at least part of the at least one data set and the at least one pre-defined data set and the spatial audio signal may comprise generating a first part binaural audio signal based on the combination of the first part of the at least one data set and the at least one pre-defined data set and the spatial audio signal.

Generating a combination of at least part of the at least one data set and the at least one pre-defined data set may further comprise generating a second part combination comprising one of: a combination of the second part of the at least one data set and at least part of the at least one pre-defined data set; at least part of the at least one pre-defined data set where the second part of the at least one data set is a null set; and at least part of the at least one pre-defined data set where the second part of the at least one data set is determined to substantially have an error, is noisy, or corrupted.

Generating a binaural audio signal based on the combination of at least part of the at least one data set and the at least one pre-defined data set, and the spatial audio signal may comprise generating a second part binaural audio signal based on the second part combination and the spatial audio signal.

Generating a binaural audio signal based on the combination of at least part of the at least one data set and the at least one pre-defined data set, and the spatial audio signal may comprise combining the first part binaural audio signal and the second part binaural audio signal.

Dividing the at least one data set into a first part and a second part may comprise: generating a first window function with a roll-off function based on an offset time from a time of determined maximum energy and a cross-over time, wherein the first window function is applied to the at least one data set to generate the first part; generating a second window function with a roll-on function based on the offset time from a time of determined maximum energy and the cross-over time, wherein the second window function is applied to the at least one data set to generate the second part.

The method comprises generating the combination of at least part of the at least one data set and the at least one pre-defined data set.

Generating the combination of at least part of the at least one data set and the at least one pre-defined data set may comprise: generating an initial combined data set based on a selection of the at least one data set; determining at least one gap within the initial combined data set defined by at least one pair of adjacent elements of the initial combined data set with a directional difference greater than a determined threshold; and for each gap: identifying within the at least one pre-defined data set an element of the at least one pre-defined data set with a direction which is located within the gap; and combining the identified element of the at least one pre-defined data set and the initial combined data set.

The determined threshold may comprise: an azimuth threshold; and an elevation threshold.

The combination of at least part of the at least one data set and the at least one pre-defined data set may be defined over a range of directions and wherein over the range of directions the combination comprises no directional gaps greater than a defined threshold.

The at least one part of the at least one data set may be elements of the at least one data set which are at least one of: free from substantial error; free from substantial noise; and free from substantial corruption.

Obtaining a spatial audio signal comprising at least one audio signal and spatial metadata associated with the at least one audio signal may comprise receiving the spatial audio signal from a further apparatus.

Obtaining at least one data set related to binaural rendering may comprise receiving the at least one data set from a further apparatus.

According to a third aspect there is provided an apparatus comprising at least one processor and at least one memory including a computer program code, the at least one memory and the computer program code configured to, with the at least one processor, cause the apparatus at least to: obtain a spatial audio signal comprising at least one audio signal and spatial metadata associated with the at least one audio signal; obtain at least one data set related to binaural rendering; obtain at least one pre-defined data set related to binaural rendering; and generate a binaural audio signal based on a combination of at least part of the at least one data set and the at least one pre-defined data set, and the spatial audio signal.

The at least one data set related to binaural rendering may comprise at least one of: a set of binaural room impulse responses or transfer functions; a set of head related impulse responses or transfer functions; a data set based on binaural room impulse responses or transfer functions; and a data set based on head related impulse responses or transfer functions.

The at least one pre-defined data set related to binaural rendering may comprise at least one of: a set of pre-defined binaural room impulse responses or transfer functions; a set of pre-defined head related impulse responses or transfer functions; a pre-defined data set based on binaural room impulse responses or transfer functions; and a pre-defined data set based on captured head related impulse responses or transfer functions.

The apparatus may be further caused to: divide the at least one data set into a first part and a second part; and generate a first part combination of the first part of the at least one data set and the at least one pre-defined data set.

The apparatus caused to generate a binaural audio signal based on a combination of at least part of the at least one data set and the at least one pre-defined data set and the spatial audio signal may be caused to generate a first part binaural audio signal based on the combination of the first part of the at least one data set and the at least one pre-defined data set and the spatial audio signal.

The apparatus caused to generate a combination of at least part of the at least one data set and the at least one pre-defined data set may be further caused to generate a second part combination comprising one of: a combination of the second part of the at least one data set and at least part of the at least one pre-defined data set; at least part of the at least one pre-defined data set where the second part of the at least one data set is a null set; and at least part of the at least one pre-defined data set where the second part of the at least one data set is determined to substantially have an error, is noisy, or corrupted.

The apparatus caused to generate a binaural audio signal based on the combination of at least part of the at least one data set and the at least one pre-defined data set, and the spatial audio signal may be caused to generate a second part binaural audio signal based on the second part combination and the spatial audio signal.

The apparatus caused to generate a binaural audio signal based on the combination of at least part of the at least one data set and the at least one pre-defined data set, and the spatial audio signal may be caused to combine the first part binaural audio signal and the second part binaural audio signal.

The apparatus caused to divide the at least one data set into a first part and a second part may be caused to: generate a first window function with a roll-off function based on an offset time from a time of determined maximum energy and a cross-over time, wherein the first window function is applied to the at least one data set to generate the first part; generate a second window function with a roll-on function based on the offset time from a time of determined maximum energy and the cross-over time, wherein the second window function is applied to the at least one data set to generate the second part.

The apparatus may be caused to generate the combination of at least part of the at least one data set and the at least one pre-defined data set.

The apparatus caused to generate the combination of at least part of the at least one data set and the at least one pre-defined data set may be caused to: generate an initial combined data set based on a selection of the at least one data set; determine at least one gap within the initial combined data set defined by at least one pair of adjacent elements of the initial combined data set with a directional difference greater than a determined threshold; and for each gap: identify within the at least one pre-defined data set an element of the at least one pre-defined data set with a direction which is located within the gap; and combine the identified element of the at least one pre-defined data set and the initial combined data set.

The determined threshold may comprise: an azimuth threshold; and an elevation threshold.

The combination of at least part of the at least one data set and the at least one pre-defined data set may be defined over a range of directions and wherein over the range of directions the combination comprises no directional gaps greater than a defined threshold.

The at least one part of the at least one data set may be elements of the at least one data set which are at least one of: free from substantial error; free from substantial noise; and free from substantial corruption.

The apparatus caused to obtain a spatial audio signal comprising at least one audio signal and spatial metadata associated with the at least one audio signal may be caused to receive the spatial audio signal from a further apparatus.

The apparatus caused to obtain at least one data set related to binaural rendering may be caused to receive the at least one data set from a further apparatus.

According to a fourth aspect there is provided an apparatus comprising: obtaining circuitry configured to obtain a spatial audio signal comprising at least one audio signal and spatial metadata associated with the at least one audio signal; obtaining circuitry configured to obtain at least one data set related to binaural rendering; obtaining circuitry configured to obtain at least one pre-defined data set related to binaural rendering; and generating circuitry configured to generate a binaural audio signal based on a combination of at least part of the at least one data set and the at least one pre-defined data set, and the spatial audio signal.

According to a fifth aspect there is provided a computer program comprising instructions [or a computer readable medium comprising program instructions] for causing an apparatus to perform at least the following: obtaining a spatial audio signal comprising at least one audio signal and spatial metadata associated with the at least one audio signal; obtaining at least one data set related to binaural rendering; obtaining at least one pre-defined data set related to binaural rendering; and generating a binaural audio signal based on a combination of at least part of the at least one data set and the at least one pre-defined data set, and the spatial audio signal.

According to a sixth aspect there is provided a non-transitory computer readable medium comprising program instructions for causing an apparatus to perform at least the following: obtaining a spatial audio signal comprising at least one audio signal and spatial metadata associated with the at least one audio signal; obtaining at least one data set related to binaural rendering; obtaining at least one pre-defined data set related to binaural rendering; and generating a binaural audio signal based on a combination of at least part of the at least one data set and the at least one pre-defined data set, and the spatial audio signal.

According to a seventh aspect there is provided an apparatus comprising: means for obtaining a spatial audio signal comprising at least one audio signal and spatial metadata associated with the at least one audio signal; means for obtaining at least one data set related to binaural rendering; means for obtaining at least one pre-defined data set related to binaural rendering; and means for generating a binaural audio signal based on a combination of at least part of the at least one data set and the at least one pre-defined data set, and the spatial audio signal.

According to an eighth aspect there is provided a computer readable medium comprising program instructions for causing an apparatus to perform at least the following: obtaining a spatial audio signal comprising at least one audio signal and spatial metadata associated with the at least one audio signal; obtaining at least one data set related to binaural rendering; obtaining at least one pre-defined data set related to binaural rendering; and generating a binaural audio signal based on a combination of at least part of the at least one data set and the at least one pre-defined data set, and the spatial audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
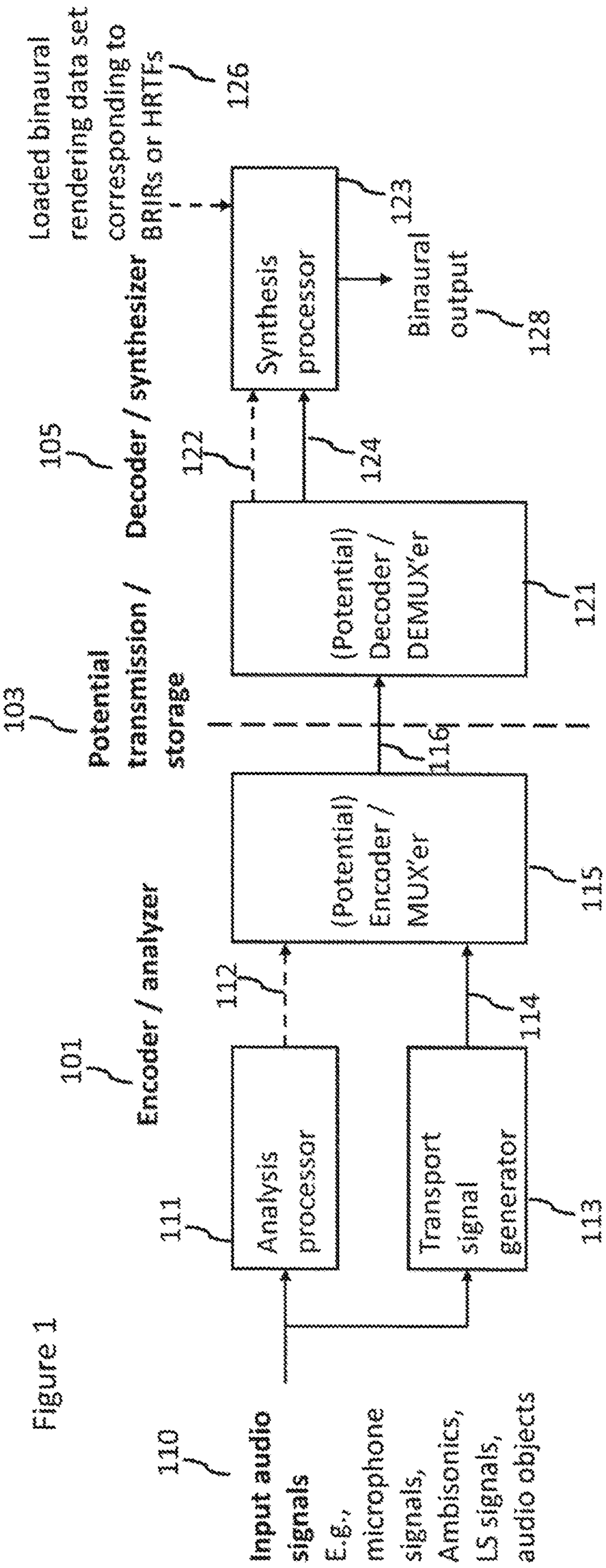
FIG. 1 shows schematically a system of apparatus suitable for implementing some embodiments.

The following describes in further detail suitable apparatus and possible mechanisms for the rendering of spatial audio stream (or spatial audio signal) containing (transport) audio signal(s) and spatial metadata associated with the audio signal(s) using loaded binaural data sets. The aim of which is to enable loading HRTFs and BRIRs with suboptimal directional resolution to the binaural renderer while still providing optimal reproduced audio quality (accurate directional perception and uncoloured timbre). This would be significant where listeners load their individual HRTFs/BRIRs, which typically cannot be measured with high directional resolution.

Using individually measured HRTFs/BRIRs has been shown to improve localization and enhance timbre. Thus, listeners may be interested in loading their individual responses to binaural renderers (and/or codecs containing a binaural renderer, such as IVAS). However, as obtaining such responses is not common (at the time of the drafting this application), there is no regular or standardized way of measuring them. As a result, they may be measured in a variety of ways, which may also lead to the responses having arbitrary direction resolution (i.e., the number of the responses, and the spacing between the datapoints of the available responses can differ significantly between the various methods of measurement). In practice, fewer HRTFs may be available than expected in known binaural rendering methods that aim to render audio to all directions with high spatial fidelity.

This variety effect is even more apparent in the context of BRIR databases used in the rendering of the spatial audio signals. They typically have lower directional resolution than the HRTF databases, even for professionally produced data sets (and typically even lower resolution in user-provided data sets). There are practical reasons for this in that it is difficult and very time-consuming to install custom binaural measurement systems to normal rooms. Thus, typically only a few data points are available, corresponding, e.g., to the most common multichannel loudspeaker layouts, such as 5.1 and/or 7.1+4.

The sparsity of a HRTF/BRIR data set causes problems for the binaural rendering. For example the HRTF/BRIR data set may contain only horizontal directions, while the rendering may need to support also rendering elevations. The renderer needs to render the sound accurately also those directions where the data set is sparse (for example, a 5.1 binaural rendering data set does not have HRTF/BRIR at 180 degrees). Additionally the rendering may need head tracking on any axis, and thus rendering to any direction with good spatial accuracy becomes relevant. Interpolation between the data points when the data set is sparse is in principle an option, however, interpolation with sparse data points can lead to severe artefacts, such as coloration in the timbre of the sound, and imprecise and non-point-like localization. Furthermore the user-provided data set can also be corrupted, for example, it may have low SNR or otherwise distorted or corrupted responses, which affects the quality (e.g., timbre, spatial accuracy, externalization) of the binaural rendering.

Furthermore, when the loaded data set is a HRTF data set, then by definition, the data set includes the transfer function only in anechoic space and does not involve reflections nor reverberation. However, rendering the room effect (containing reflections and/or reverberation) is known to be beneficial with certain signals types, such as multichannel signals (e.g., 5.1). The multichannel signals are produced to be listened in normal rooms with reverberation. If they are listened to in an anechoic space (HRTF rendering corresponds to it), they are perceived to be lacking spaciousness and envelopment, thus decreasing the perceived audio quality. Hence, the binaural renderer should support adding the room effect in all cases (even if the loaded data set is an HRTF data set).

Thus the concept is one in which there is provided a renderer that enables loading HRTF and BRIR sets with arbitrary resolutions, and potentially with measurement quality issues. Furthermore the renderer as discussed in some embodiments is configured to render binaural audio from data formats that may have sound sources in arbitrary directions (such as the MASA format and/or headtracked binauralization). Furthermore in some embodiments the renderer is configured to render binaural audio with and without added room response from any loaded HRTF and BRIR data set.

The embodiments furthermore can be configured to operate without the need for high-directional-resolution data sets (which cannot be guaranteed in all cases, especially with data sets loaded by a listener), and furthermore implement binaural rendering with good quality to arbitrary directions (resulting in colouration of timbre and suboptimal spatialization).

The embodiments relate to binaural rendering of a spatial audio stream containing transport audio signal(s) and spatial metadata using loaded binaural data sets (based on, e.g., HRTFs and BRIRs). The embodiments thus describe a method that can produce binaural spatial audio with good directional accuracy and uncoloured timbre even with binaural data sets having low directional resolution. Additionally in some embodiments this can be achieved by combining (including a perceptual matching procedure) the loaded binaural data set with a predefined binaural data set and using the combined binaural data set to render the spatial audio stream to a binaural output.

The binaural renderer in some embodiments may, e.g., be part of a decoder (such as an IVAS decoder). Thus, it may receive or retrieve spatial audio streams to be rendered to binaural output. Moreover, the binaural renderer supports loading binaural data sets. These binaural data sets may, e.g., be loaded by the listeners and may, e.g., contain individual responses tailored for them.

The binaural renderer furthermore in some embodiments comprises a pre-defined binaural data set. In a typical situation, the pre-defined binaural rendering data set is characterized by being spatially accurate, which means that it is based on an BRIR/HRTF data set that is spatially dense. The pre-defined data set thus represents an ensured high-quality default data set that pre-exists in the renderer.

The loaded binaural rendering data set may consist of responses that are selected to be used in rendering (e.g., as they are personal responses), but are suboptimal in some sense. For example, the suboptimality can mean:

The data set is based on a sparse set of measurements (for example, corresponding to 22.2 or 5.1 directions). Some directions (e.g., elevations, sides) may have no responses. The present invention allows loading as low as a single (two-ear) response, still providing rendering to any direction; and The data set is affected by noise or corrupted measurement procedure.

In some embodiments the loaded binaural data set is combined with the pre-defined data set, e.g., by:

Appending the loaded data set with the pre-defined data set, so as to substantially utilize the pre-defined data at those directions where the loaded data is sparse (i.e., large angular gaps at the data set); and Replacing, in part or completely, the loaded binaural rendering data with the pre-defined binaural rendering data.

In addition, the embodiments describe an implementation which performs a perceptual matching procedure on the combined data set, e.g., by:

Adjusting the spectral properties of the combined data set based on the loaded data set; and Adjusting the inter-aural phase/time properties of the combined data set based on the loaded data set.

The resulting binaural data set may thus be spatially dense and match the features of the loaded binaural data set. The spatial audio is rendered using this data set. As a result, the listener gets individualized binaural spatial audio playback with accurate directional perception and uncoloured timbre.

In some embodiments when the loaded data set is a HRTF data set, and when binaural reverberation needs to be rendered, predefined binaural reverberation data (or "late part rendering data") is used to render the binaural reverberation.

Additionally in some embodiments when the pre-defined data set is a BRIR data set, the early part of the pre-defined data set is extracted to be used in the processing operations as discussed in detail herein.

In some embodiments when the loaded data set is a BRIR data set the early part of the loaded data set is extracted to be used in the processing operations as discussed in detail herein.

Furthermore in some embodiments when binaural reverberation needs to be rendered, the late part of the loaded data set is extracted to be used for rendering the binaural reverberation. In some embodiments it may be used directly, or the predefined late reverberation binaural data may be modified so that it matches the features of the loaded data set (e.g., reverberation times or spectral properties).

With respect to FIG. 1 an example apparatus and system for implementing audio capture and rendering are shown according to some embodiments.

The system 199 is shown with encoder/analyser 101 part and a decoder/synthesizer 105 part.

The encoder/analyser 101 part in some embodiments comprises an audio signals input configured to receive input audio signals 110. The input audio signals can be from any suitable source, for example: two or more microphones mounted on a mobile phone; other microphone arrays, e.g., B-format microphone or Eigenmike; Ambisonic signals, e.g., first-order Ambisonics (FOA), higher-order Ambisonics (HOA); Loudspeaker surround mix and/or objects. The input audio signals 110 may be provided to an analysis processor 111 and to a transport signal generator 113.

The encoder/analyser 101 part may comprise an analysis processor 111. The analysis processor 111 is configured to perform spatial analysis on the input audio signals yielding suitable metadata 112. The purpose of the analysis processor 111 is thus to estimate spatial metadata in frequency bands. For all of the aforementioned input types, there exists known methods to generate suitable spatial metadata, for example directions and direct-to-total energy ratios (or similar parameters such as diffuseness, i.e., ambient-to-total ratios) in frequency bands. These method are detailed herein, however, some examples may comprise the performing of a suitable time-frequency transform for the input signals, and then in frequency bands when the input is a mobile phone microphone array, estimating delay-values between microphone pairs that maximize the inter-microphone correlation, and formulating the corresponding direction value to that delay (as described in GB Patent Application Number 1619573.7 and PCT Patent Application Number PCT/FI2017/050778), and formulating a ratio parameter based on the correlation value. The metadata can be of various forms and can contain spatial metadata and other metadata. A typical parameterization for the spatial metadata is one direction parameter in each frequency band $\theta(k, n)$ and an associated direct-to-total energy ratio in each frequency band $r(k, n)$, where k is the frequency band index and n is the temporal frame index. Determining or estimating the directions and the ratios depends on the device or implementation from which the audio signals are obtained. For example the metadata may be obtained or estimated using spatial audio capture (SPAC) using methods described in GB Patent Application Number 1619573.7 and PCT Patent Application Number PCT/FI2017/050778 In other words, in this particular context, the spatial audio parameters comprise parameters which aim to characterize the sound-field. In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons.

When the input is a FOA signal or B-format microphone the analysis processor 111 can be configured to determine parameters such as an intensity vector, based on which the direction parameter is formulated, and comparing the intensity vector length to the overall sound field energy estimate to determine the ratio parameter. This method is known in the literature as Directional Audio Coding (DirAC).

When the input is HOA signal, the analysis processor may either take the FOA subset of the signals and use the method above, or divide the HOA signal into multiple sectors, in each of which the method above is utilized. This sector-based method is known in the literature as higher order DirAC (HO-DirAC). In this case, there is more than one simultaneous direction parameter per frequency band.

When the input is loudspeaker surround mix and/or objects, the analysis processor 111 may be configured to convert the signal into a FOA signal(s) (via use of spherical harmonic encoding gains) and to analyse direction and ratio parameters as above.

As such the output of the analysis processor 111 is spatial metadata determined in frequency bands. The spatial metadata may involve directions and ratios in frequency bands but may also have any of the metadata types listed previously. The spatial metadata can vary over time and over frequency.

In some embodiments the spatial analysis may be implemented external to the system 199. For example in some embodiments the spatial metadata associated with the audio signals may be provided to an encoder as a separate bit-stream. In some embodiments the spatial metadata may be provided as a set of spatial (direction) index values.

The encoder/analyser 101 part may comprise a transport signal generator 113. The transport signal generator 113 is configured to receive the input signals and generate a suitable transport audio signal 114. The transport audio signal may be a stereo or mono audio signal. The generation of transport audio signal 114 can be implemented using a known method such as summarised below.

When the input is mobile phone microphone array audio signals, the transport signal generator 113 may be configured to select a left-right microphone pair, and applying suitable processing to the signal pair, such as automatic gain control, microphone noise removal, wind noise removal, and equalization.

When the input is a FOA/HOA signal or B-format microphone, the transport signal generator 113 may be configured to formulate directional beam signals towards left and right directions, such as two opposing cardioid signals.

When the input is loudspeaker surround mix and/or objects, the transport signal generator 113 may be configured to generate a downmix signal that combines left side channels to left downmix channel, and same for right side, and adds centre channels to both transport channels with a suitable gain.

In some embodiments the transport signal generator 113 is configured to bypass the input. For example, in some situations, where the analysis and synthesis occurs at the same device at a single processing step, without intermediate encoding. The number of transport channels can also be any suitable number (rather the one or two channels as discussed in the examples).

In some embodiments the encoder/analyser part 101 may comprise an encoder/multiplexer 115. The encoder/multiplexer 115 can be configured to receive the transport audio signals 114 and the metadata 112. The encoder/multiplexer 115 may furthermore be configured to generate an encoded or compressed form of the metadata information and transport audio signals. In some embodiments the encoder/multiplexer 115 may further interleave, multiplex to a single data stream 116 or embed the metadata within encoded audio signals before transmission or storage. The multiplexing may be implemented using any suitable scheme.

The encoder/multiplexer 115 for example could be implemented as an IVAS encoder, or any other suitable encoder. The encoder/multiplexer 115 thus is configured to encode the audio signals and the metadata and form a bit stream 116 (e.g., an IVAS bit stream).

This bitstream 116 may then be transmitted/stored 103 as shown by the dashed line. In some embodiments there is no encoder/multiplexer 115 (and thus no decoder/demultiplexer 121 as discussed hereafter).

The system 199 furthermore may comprise a decoder/synthesizer part 105. The decoder/synthesizer part 105 is configured to receive, retrieve or otherwise obtain the bitstream 116, and from the bitstream generate suitable audio signals to be presented to the listener/listener playback apparatus.

The decoder/synthesizer part 105 may comprise a decoder/demultiplexer 121 configured to receive the bitstream and demultiplex the encoded streams and then decode the audio signals to obtain the transport signals 124 and metadata 122.

Furthermore in some embodiments, as discussed above there may not be any demultiplexer/decoder 121 (for example where there is no associated encoder/multiplexer 115 as both the encoder/analyser part 101 and the decoder/synthesizer 105 are located within the same device).

The decoder/synthesizer part 105 may comprise a synthesis processor 123. The synthesis processor 123 is configured to obtain the transport audio signals 124, the spatial metadata 122 and loaded binaural rendering data set 126 corresponding to BRIRs or HRTFs and produces a binaural output signal 128 that can be reproduced over headphones.

Figure 2:
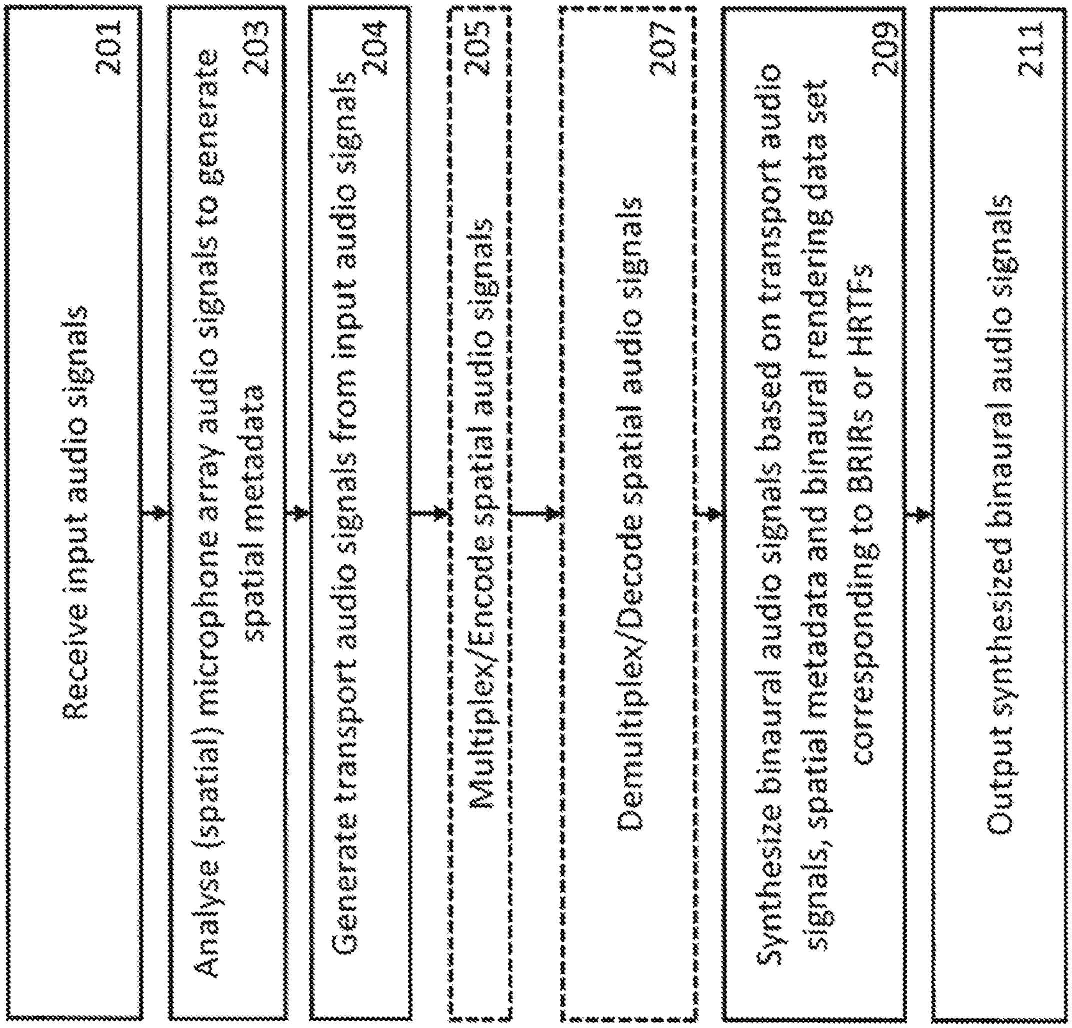
FIG. 2 shows a flow diagram of the operation of the example apparatus according to some embodiments.

The operations of this system are summarized with respect to the flow diagram as shown in FIG. 2. FIG. 2 shows for example the receiving of the input audio signals as shown in step 201.

Then the flow diagram shows the analysis (spatial) of the input audio signals to generate the spatial metadata as shown in FIG. 2 by step 203.

The transport audio signals are then generated from the input audio signals as shown in FIG. 2 by step 204.

The generated transport audio signals and the metadata may then be multiplexed as shown in FIG. 2 by step 205. This is shown in FIG. 2 as an optional dashed box.

The encoded signals can furthermore be demultiplexed and decoded to generate transport audio signals and spatial metadata as shown in FIG. 2 by step 207. This is also shown as an optional dashed box.

Then binaural audio signals can be synthesized based on the transport audio signals, spatial metadata and binaural rendering data set corresponding to BRIRs or HRTFs as shown in FIG. 2 by step 209.

The synthesized binaural audio signals may then be output to a suitable output device, for example a set of headphones, as shown in FIG. 2 by step 211.

Figure 3:
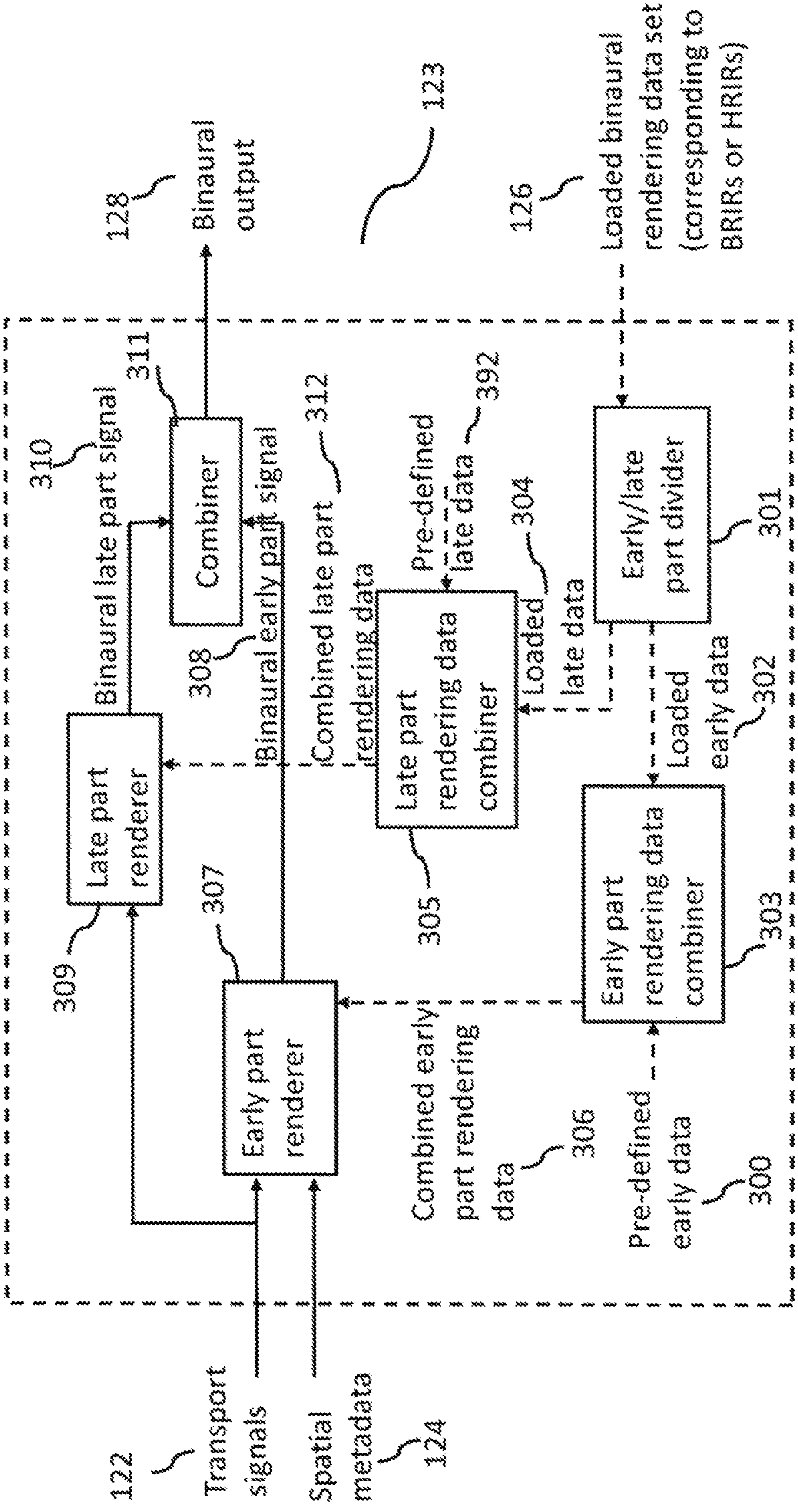
FIG. 3 shows schematically a synthesis processor as shown in FIG. 1 according to some embodiments.

With respect to FIG. 3 is shown the synthesis processor 123 in further detail.

In some embodiments the synthesis processor 123 comprises an early/late part divider 301. The early/late part divider 301 is configured to receive the binaural rendering data set 126 (corresponding to BRIRs or HRTFs). The binaural rendering data set in some embodiments may be in any suitable form. For example in some embodiments the data set is in the form of HRTFs (head-related transfer functions), HRIRs (head-related impulse responses), BRIRs (binaural room impulse responses) or BRTFs (binaural room transfer functions) for a set of determined directions. In some embodiments the data set is a parametrized data set based on HRTFs, HRIRs, BRIRs or BRTFs. The parametrization could be for example time-differences and spectra in frequency bands such as Bark bands. Furthermore, in some embodiments, the data set may be HRTFs, HRIRs, BRIRs or BRTFs converted to another domain, for example converted into spherical harmonics.

In the following examples the rendering data is in a typical form of HRIRs or BRIRs (i.e., a set of time domain impulse response pairs) for a set of determined directions. If the responses were HRTFs or BRTFs, they can for example be inverse time-frequency transformed into HRIRs or BRIRs for the following processing. Other examples are also described.

The Early/late part divider 301 is configured to divide the loaded binaural rendering data into parts which are defined as loaded early data 302 which is provided to the early part rendering data combiner 303 and loaded late data 304 which is provided to the late part rendering data combiner 305.

In some embodiments where the data set contains only HRIR data, then this is directly provided as the loaded early data 302. The loaded early data 302 may in some embodiments be transformed into the frequency domain at this point. The loaded late data 304 in such an example is an indication only that the late part does not exist.

In some embodiments where the data set is a BRIR data set, then windowing can be applied to divide the responses to loaded early data 302 being mostly directional (containing direct part and potentially first reflection(s)) and loaded late data 304 being mostly reverberation. The division could be performed for example with the following steps.

Firstly measure the time of the maximum energy of the BRIRs (this provides an approximate of the time of the first arriving sound).

Figure 5:
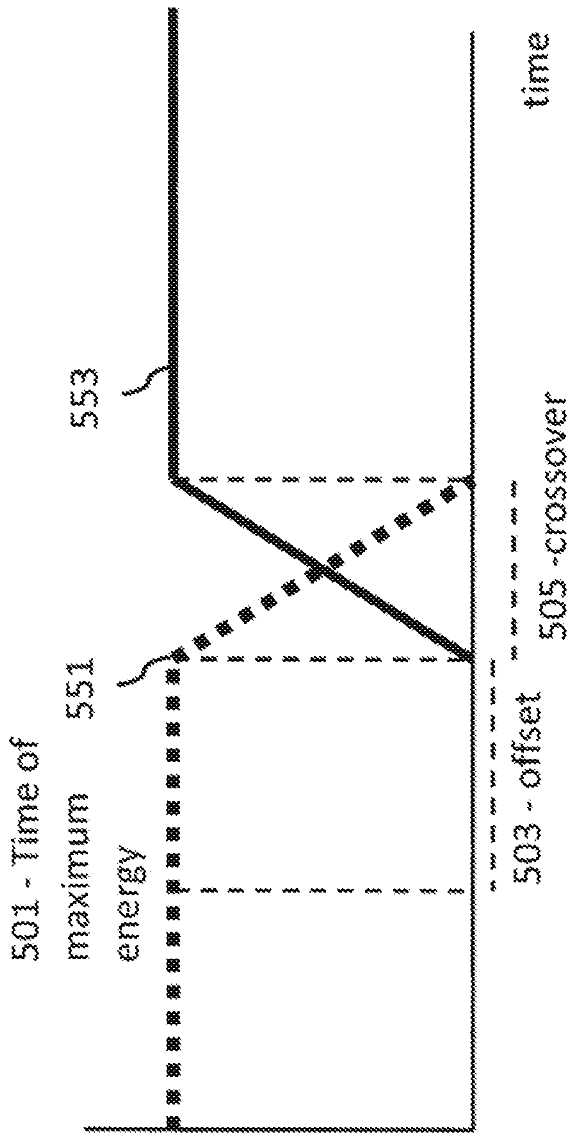
FIG. 5 shows an example early-late part divider according to some embodiments.

Secondly design window functions. An example design window function is shown in FIG. 5. FIG. 5 shows, for example, a window function which comprises a first window 551, for extracting the early part, which is unity until a defined offset 503 time after the time of maximum energy 501. The first window 551 function decreases through a crossover 505 time until it is zero afterwards.

The window function further comprises a second window 553, for extracting the late part, which has a zero value up to the start of the crossover 505 time. The second window 553 function value increases through the crossover 505 time up to unity and it is unity afterwards.

This is an example only of a suitable function and other functions may be employed. In some embodiments the offset time could, for example, be 5 ms and the crossover time, for example, 2 ms.

Thirdly the window functions could be applied to the BRIRs to obtain the windowed early parts and windowed late parts.

Fourthly the windowed early parts are provided as the loaded early data 302 to the early part rendering data combiner 303. The loaded early data may in some embodiments be transformed into the frequency domain at this point.

Fifthly the windowed late parts are provided as the loaded late data 304 to the late part rendering data combiner 305.

In some embodiments the synthesis processor also contains pre-defined early data 300 and pre-defined late data 392, which could have been generated with the equivalent steps as described above, based on pre-defined HRIR, BRIR, etc. responses. In these embodiments where the data set does not contain a late part, then the pre-defined late part 392 is an indication only that the late part does not exist.

In some embodiments the synthesis processor 123 comprises an early part rendering data combiner 303. The early part rendering data combiner 303 is configured to receive the pre-defined early data 300 and the loaded early data 302. The early part rendering data combiner 303 is configured to evaluate if the loaded early data is spatially dense.

For example in some embodiments the early part rendering data combiner 303 is configured to determine whether the data is spatially dense based on a Horizontal density criterion. In these embodiments the early part rendering data combiner may check that the horizontal resolution of the responses is dense enough. For example, the largest azimuth gap between horizontal responses is not larger than a threshold. This horizontal response distance threshold may be, for example, 10 degrees.

For example in some embodiments the early part rendering data combiner 303 is configured to determine whether the data is spatially dense based on an elevation density criterion. In these embodiments the early part rendering data combiner may check that there are no directions at elevated angles where the nearest response is angularly further away than a threshold. This vertical response distance threshold may be, for example, 10 or 20 degrees.

If these conditions are met, then the early part rendering data combiner 303 is configured to provide the loaded early data 302 without modification as combined early part rendering data 306 to the early part renderer 307.

If the conditions are not met, then the early part rendering data combiner 303 is configured to also use the pre-defined early data 300 to form the combined early part rendering data.

In the examples described herein it is assumed that the pre-defined early data 300 meets the horizontal density criterion and elevation density criterion as described above. Furthermore in the embodiments described herein the combining is based on the loaded data set not meeting a suitable density criteria, however a combining may be implemented also in the situation where the above density criteria were met, but the loaded data has a separate defect, for example the data has poor SNR or is otherwise corrupted.

Figure 6:
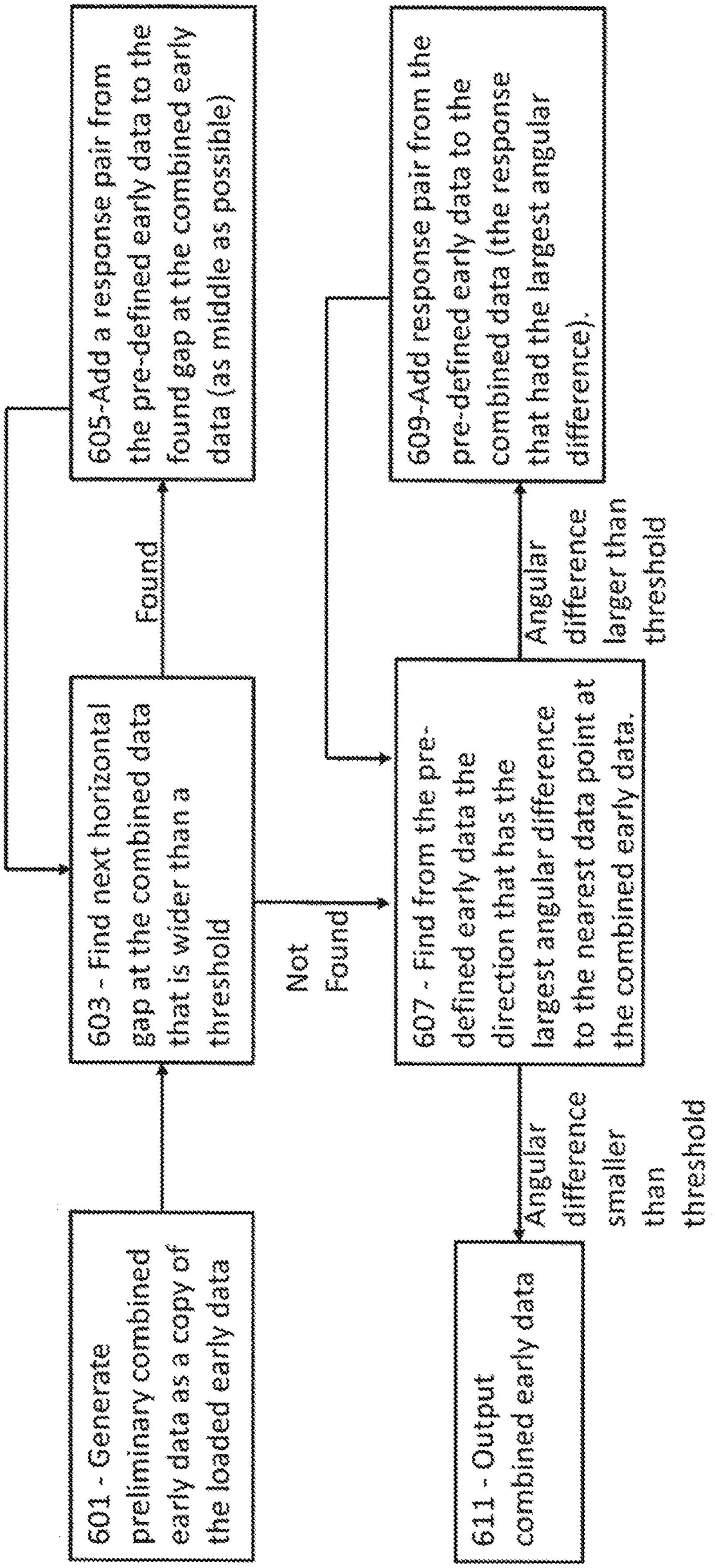
FIG. 6 shows a flow diagram of an example method for generating the combined early part rendering data according to some embodiments.

The early part rendering data combiner 303 may for example be configured to combine the data in the manner as described in FIG. 6. In this approach the loaded early rendering data 302 is used for rendering sounds at those directions where the loaded data exists, and pre-defined early data 300 at other directions. This approach is useful when it is known that the loaded early data contains high quality measurements (e.g., good SNR, valid measurement procedures), but it needs to be appended at some directions because it is sparse.

FIG. 6 shows a flow diagram of the combination of the loaded early part data 302 and the predefined early part data 300 according to these embodiments.

The first operation is one of generating a preliminary combined early data as a copy of the loaded early data as shown in FIG. 6 by step 601. In other words the early part rendering data combiner 303 generates first a preliminary combined early data by simply copying the loaded early data to the combined early part rendering data 306.

The next operation is one of evaluating if there is a horizontal gap in the combined data where the gap is larger than a threshold. This is shown in FIG. 6 by step 603.

If such a gap is found, then a response is added from the pre-defined early data 300 to the combined early part data 306 into the gap. This is shown in FIG. 6 by step 605.

The operation can then loop back to a further evaluation check shown by the arrow back to step 603. In other words, the procedure of evaluation and filling where needed is repeated until there is no horizontal gap in the combined data that is larger than the threshold.

Where there was no original horizontal gap in the combined data or where the gaps have been filled then the early part rendering data combiner 303 can be configured to check all directions of the pre-defined early data. In other words the operation is one of finding from the pre-defined early data the direction that has the largest angular difference to the nearest data point at the combined early part data and determining whether this difference is larger than a threshold as shown in FIG. 6 by step 607.

Where the difference is larger than the threshold then the corresponding response is added from the pre-defined early part data 300 to the combined early part data 306 as shown in FIG. 6 by step 609.

The operation then returns to step 607 where the procedure is repeated as long as the aforementioned largest angular difference estimate is larger than a threshold.

Where the angular difference is smaller than the threshold the combined early part data is then output as shown in FIG. 6 by step 611.

In some embodiments the early part rendering data combiner 603 is configured to use directly the pre-defined early part data 600 as the combined early part data, without using the loaded early part data 602. The approach is useful when there may be suboptimalities (e.g. poor SNR, improper measurement procedures) at the loaded data set.

The resulting combined early data 306 therefore has data points (response directions) with such density that the aforementioned horizontal and vertical density criteria are met.

In some embodiments the early part rendering data combiner 303 is configured to apply a perceptual matching procedure to the data points at the combined early part data 306 that are from the pre-defined early data 300.

In some embodiments therefore the early part rendering data combiner 303 is configured to perform spectral matching.

As a preliminary step, the energies of all data points (directions) of the original pre-defined and loaded early data sets are measured in frequency bands $$E_{loaded}(k, q_l) = \sum_{b \in k} \sum_{ch=1}^{2} |HRTF_{loaded}(b, ch, q_l)|^2$$

$$E_{pre}(k, q_p) = \sum_{b \in k} \sum_{ch=1}^{2} |HRTF_{pre}(b, ch, q_p)|^2$$

where $HRTF_{loaded}(b, ch, q)$ are the complex gains of the loaded early part data 302, $HRTF_{pre}(b, ch, q)$ are the complex gains of the pre-defined early part data 300, b is the bin index (where expression $b \in k$ means "all bins belonging to band k"), ch is the channel (i.e. ear) index, $q_l$ is the index of the response at the loaded early data set, and $q_p$ is the index at the pre-defined early data set.

Even if the expression HRTF is used the response may not be anechoic, but may correspond to the early part of the BRIR responses. In some embodiments $HRTF(b, ch, q_c)$ denotes the complex gains of the combined early part data 306, and $q_c$ as the corresponding data set index.

In some embodiments there are defined two angular values:

$\alpha_{l,c}(q_l, q_c)$ is the angle difference between the $q_l$:th data point at the loaded early data set and the $q_c$:th data point at the combined early data set; and $\alpha_{p,c}(q_p, q_c)$ is the angle difference from the $q_p$:th data point at the pre-defined early data set and the $q_c$:th data point at the combined early data set.

Then in some embodiments the following operations are performed for each data point $q_c$ at the combined early part data that originates from the pre-defined early part data 300.

Firstly find a weighted average energy value of the loaded early data set $$E_{loaded\_w}(k, q_c) = \frac{\sum_{q_l=1}^{Q_l} E_{loaded}(k, q_l) w(\alpha_{l,c}(q_l, q_c))}{\sum_{q_l=1}^{Q_l} w(\alpha_{l,c}(q_l, q_c))}$$

where $Q_l$ is the number of data points at the loaded early data set and $w(\alpha_{l,c}(q_l, q_c))$ is a weighting formula that increases when $\alpha_{l,c}(q_l, q_c)$ decreases. For example, $$w(\alpha) = \left(1 - \frac{\alpha}{\pi}\right)^4.$$

Secondly find a weighted energy value of the pre-defined early data set $$E_{pre\_w}(k, q_c) = \frac{\sum_{q_p=1}^{Q_p} E_{pre}(k, q_p) w(\alpha_{p,c}(q_p, q_C))}{\sum_{q_p=1}^{Q_p} w(\alpha_{p,c}(q_p, q_c))}$$

where $Q_p$ is the number of data points at the pre-defined early data set.

Thirdly formulate equalization gains to correct the average energies $$g_{EQ}(k, q_c) = \sqrt{E_{loaded\_w}(k, q_c)/E_{pre\_w}(k, q_c)}$$

Fourthly apply the equalization gains $g_{EQ}(k)$ to the $q_c$:th response at the combined early data (which originated from the pre-defined early part data), for all bins b that belong to band k $$HRTF'(b, ch, q_c) = HRTF(b, ch, q_c)\, g_{EQ}(k, q_c)$$

The above operations can then be repeated for all indices $q_c$ at the combined early part data that originated from the pre-defined early part data, and for all frequency bands k.

In some embodiments the early part rendering data combiner is configured to optionally apply phase/time matching, which accounts for the differences in the maximum inter-aural time delay differences between the data sets. For example, the following operations can be performed for phase/time matching:

Firstly estimate, from the early part responses that are at the horizontal plane, the inter-aural time difference (ITD) at the low frequency range (for example, up until 1.5 kHz). The inter-aural time difference can be found, for example, by the difference of the medians of the group delays (at this frequency range) of the left and right ear responses. The estimated ITD values are denoted $ITD(\theta_p)$ where $\theta_p$ is the azimuth value, p=1 . . . P, and P is the number of responses at the horizontal plane.

Secondly, and separately for the response indices p that originate from the pre-defined early part data set and those that originate from the loaded early part data set, fit to the ITD data a sinusoid curve $ITD_{max} \sin\theta$, where $ITD_{max}$ is a variable to be solved. The fitting can be performed straightforwardly by testing a large number (e.g., 100) of $ITD_{max}$ values from 0.7 to 1.0 milliseconds (or some other interval), and testing which value provides the minimum difference e of $$e = \sum_p (ITD(\theta_p) - ITD_{max}\sin\theta_p)^2$$

Figure 7:
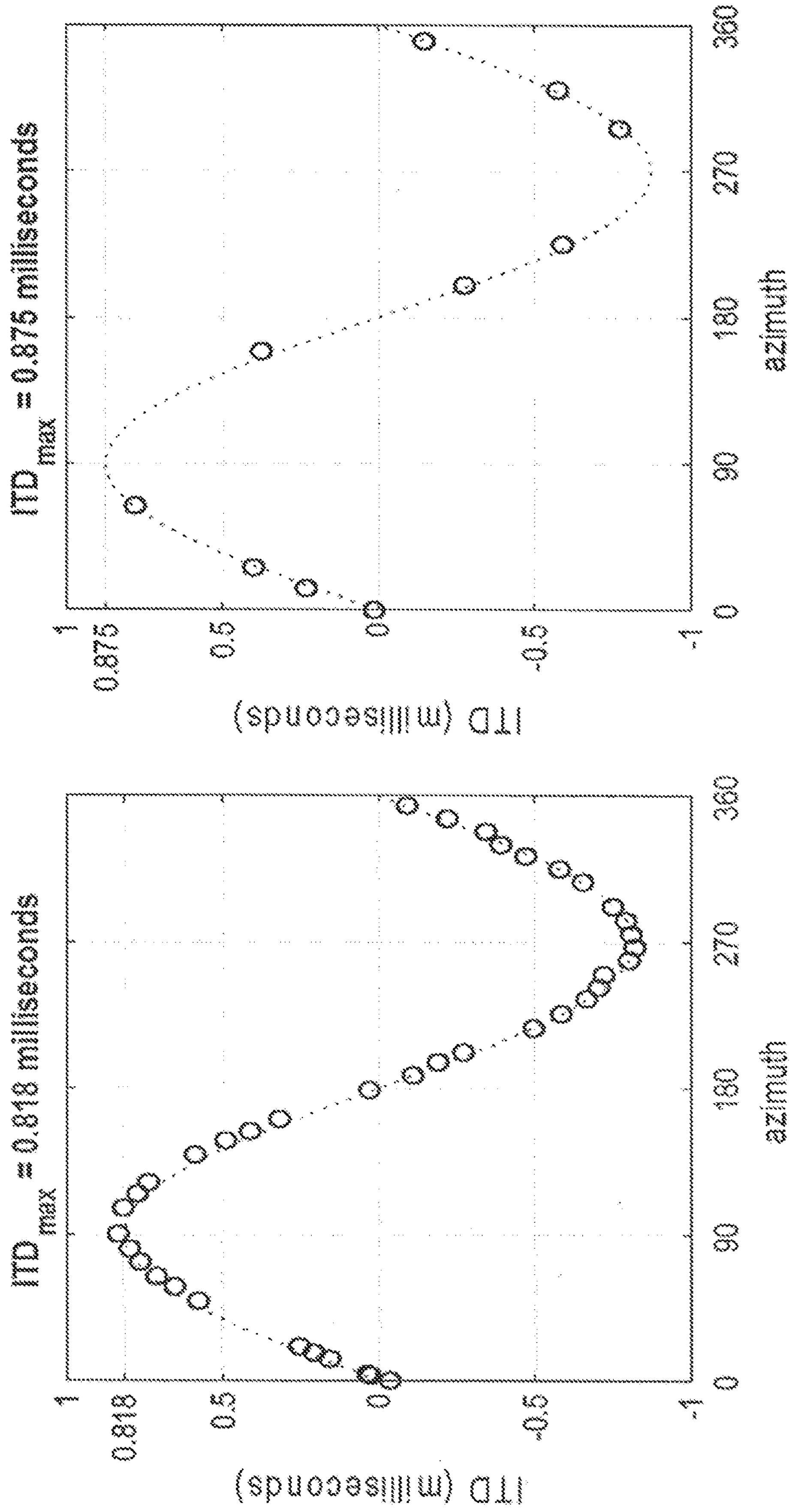
FIG. 7 shows example interpolation or curve fitting of the rendering data according to some embodiments.

The $ITD_{max}$ may be estimated from the indices p that originate from the pre-defined data set, and the result is $ITD_{max,pre}$, and also from the indices p that originate from the loaded data set, and the result is $ITD_{max,loaded}$. In FIG. 7, there are shown two examples of fitting a sinusoid curve (the dotted line) to example ITD data (shown as the circles).

Thirdly finding an ITD scaling term as $$ITD_{scale} = ITD_{max,loaded} - ITD_{max,pre}.$$

Fourthly updating those responses at the combined data that originated from the pre-defined early part data set, at least at the low frequency range (e.g., until 1.5 kHz), by $$HRTF''(b, ch, q) = HRTF'(b, ch, q)\, e^{i\pi f(b) s(ch) ITD_{scale} \sin(\theta_q)\cos(\varphi_q)}$$

where q is the response index, $\theta_q$ is the response azimuth, $\varphi_q$ is the response elevation, b is the bin index, ch is the channel (or ear) index, f(b) is the center frequency of the frequency bin in Hz, and s(ch) is a function that is 1 when ch=1, and −1 when ch=2.

In the above example the horizontal responses were used to determine ITD and finding $ITD_{max}$. In some embodiments, for example when the responses are not in the horizontal plane (but are, instead, e.g., in even spherical distribution), then all responses, or responses at a certain elevation range can be selected for $ITD_{max}$ determination. Then the aforementioned error measure may be modified for example as $$e = \sum_p (ITD(\theta_p, \varphi_p) - ITD_{max}\sin\theta_p\cos\varphi_p)^2$$

The combined early part rendering data may then be output to the early part renderer 307.

In some embodiments even if the expression HRTF"(b, ch) is used the response may not be an anechoic, but may correspond to the early part of the BRIR responses.

In some embodiments the synthesis processor 123 comprises a late part rendering data combiner 305. The late part rendering data combiner 305 may be configured to receive the pre-defined late part data 392 and the loaded late part data 304 and generate a combined late part rendering data 312 which is output to the late part renderer 309.

In some embodiments, the pre-defined and the loaded late part rendering data, when they exist, comprise late part windowed responses based on BRIRs. The late part rendering data combiner 305 in such embodiments may be configured to:

Firstly determine whether the loaded late part data 304 exists.

Where the loaded late part data 304 exists use the loaded late part data 304 directly as the combined late part rendering data 312. As an example, all the available responses are forwarded to the late part renderer 309, which will then decide how to use those responses. In some embodiments a subset of the responses may be selected (e.g., one response pair towards left and another towards right) and used as the combined late part rendering data 312 and forwarded to the late part renderer 309.

Where the loaded late part data 304 does not exist, but pre-defined late part data 392 exists, then use the pre-defined late part data as the combined late part rendering data 312. However, in this case apply equalization to the combined late part rendering data 312. The equalization gains for example can be obtained in frequency bands by:

$$g_{EQ,late}(k) = \sqrt{\frac{Q_p \Sigma_{q_l=1}^{Q_l} E_{loaded}(k, q_l)}{Q_l \Sigma_{q_p=1}^{Q_p} E_{pre}(k, q_p)}}$$

The equalization gains can be applied, for example, by frequency transforming the combined late part rendering data 312, applying the equalization gains at the frequency domain, and inverse transforming the result back to the time domain.

Where neither the loaded late part data 304 nor the pre-defined late part data 392 exists, then the combined late part rendering data 312 is only an indication that no late reverberation data exists. This will trigger, when a late part rendering is implemented, a default late part rendering procedure at the late part renderer 309, as described further below.

The combined late part rendering data 312 is then provided to the late part renderer 309.

In some embodiments the synthesis processor 123 comprises a renderer which may be split into an early part renderer 307 and late part renderer 309. The early part renderer 307 is further shown in detail with respect to FIG. 8. The early part renderer 307 is configured to receive the transport audio signals 122, spatial metadata 124, combined early part rendering data 306 and generates a suitable binaural early part signal 308 to the combiner 311.

Figure 8:
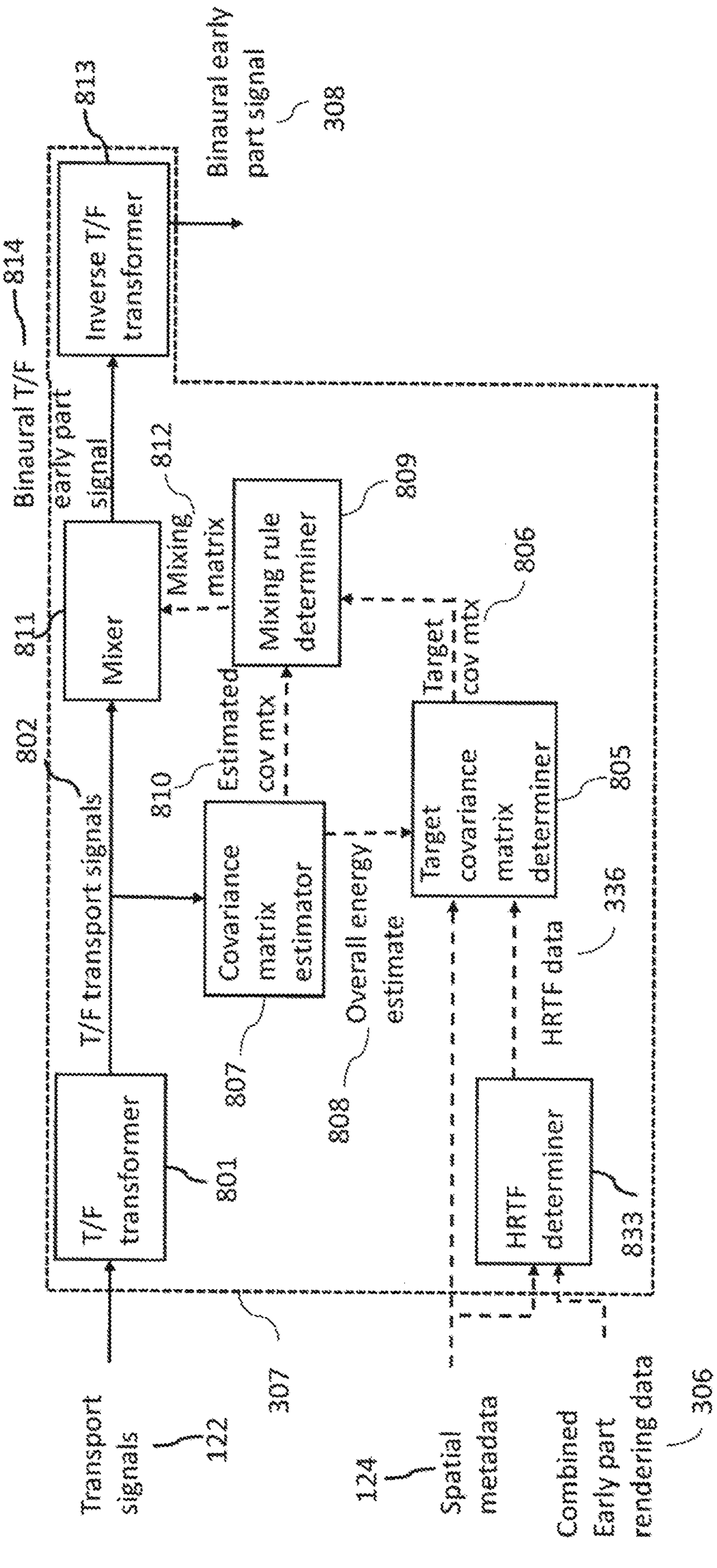
FIG. 8 shows in further detail an example early and late renderer as shown in FIG. 3 according to some embodiments.

The early part renderer 307 which is shown in further detail in FIG. 8 in some embodiments comprises a time-frequency transformer 801. The time-frequency transformer 801 is configured to receive the (time-domain) transport audio signals 122 and converts them to the time-frequency domain. Suitable transforms include, e.g., short-time Fourier transform (STFT) and complex-modulated quadrature mirror filterbank (QMF). The resulting signals may be denoted as $x_i(b, n)$, where i is the channel index, b the frequency bin index of the time-frequency transform, and n the time index. The time-frequency signals are for example expressed here in a vector form (for example for two channels the vector form is):

$$x(b, n) = \begin{bmatrix} x_1(b, n) \\ x_2(b, n) \end{bmatrix}$$

The following processing operations may then be implemented within the time-frequency domain and over frequency bands. A frequency band can be one or more frequency bins (individual frequency components) of the applied time-frequency transformer (filter bank). The frequency bands could in some embodiments approximate a perceptually relevant resolution such as the Bark frequency bands, which are spectrally more selective at low frequencies than at the high frequencies. Alternatively, in some implementations, frequency bands can correspond to the frequency bins. The frequency bands are typically those (or approximate those) where the spatial metadata has been determined by the analysis processor. Each frequency band k may be defined in terms of a lowest frequency bin $b_{low}(k)$ and a highest frequency bin $b_{high}(k)$.

The time-frequency transport signals 802 in some embodiments may be provided to a covariance matrix estimator 807 and to a mixer 811.

The early part renderer 307 in some embodiments comprises a covariance matrix estimator 807. The covariance matrix estimator 807 is configured to receive the time-frequency domain transport signals 802 and estimates a covariance matrix of the time-frequency transport signals and their overall energy estimate (in frequency bands). The covariance matrix can for example in some embodiments be estimated as:

$$C_x(k, n) = \sum_{b=b_{low}(k)}^{b_{high}(k)} x(b, n) x^H(b, n).$$

where superscript H denotes the conjugate transpose. The estimation of the covariance matrix may involve temporal averaging, such as IIR averaging or FIR averaging over several time indices n. The estimated covariance matrix 810 may be output to a mixing rule determiner 809.

The covariance matrix estimator 807 may also be configured to generate an overall energy estimate E(k, n), that is the sum of the diagonal values of $C_x(k, n)$, and provides this overall energy estimate to a target covariance matrix determiner 805.

In some embodiments the early part renderer 307 comprises a HRTF determiner 833. The HRTF determiner 833 may receive the combined early part rendering data 306 which is a suitably dense set of HRTFs. The HRTF determiner is configured to determine a 2×1 complex-valued head-related transfer function (HRTF) h(θ(k, n), k) for an angle θ(k, n) and frequency band k. In some embodiments the HRTF determiner 833 is configured to receive the spatial metadata 124 from which the angle θ(k, n) is obtained and determine the HRTFs to the output HRTF data 336.

For example, the HRTF determiner 833 may determine the HRTF at the middle frequency of band k. Where the listener head-orientation tracking is involved, the direction parameters θ(k, n) can be modified prior to obtaining the HRTFs to account for the current head orientation. In some embodiments the HRTF determiner 833 may determine diffuse-field covariance matrix for each band k, which may be formulated based on the combined early part rendering data 306, for example, by taking an equally distributed set of directions $\theta_d$ where d=1 . . . D, and by estimating the diffuse-field covariance matrix as $$C_D(k) = \frac{1}{D}\Sigma_{d=1}^{D} h(\theta_d, k)h^H(\theta_d, k).$$

The diffuse field covariance matrix may be provided as part of the output HRTF data 336 additionally to the determined HRTFs.

The HRTF determiner 833 may apply interpolation of the HRTFs by using any suitable method (when a HRTF for a direction θ(k, n) is determined). For example, in some embodiments, a set of HRTFs are decomposed into inter-aural level differences and energies of left and right ears as a function of frequency. Then, when a HRTF at a given angle is needed, then the nearest existing data points at the HRTF set are found and the delays and energies at the given angle are interpolated. These energies and delays can be then converted as complex multipliers to be used.

In some embodiments HRTFs are interpolated by converting the HRTF data set into a set of spherical harmonic beamforming matrices in frequency bands. Then, the HRTF for any angle for a frequency can be determined by formulating a spherical harmonic weight vector for that angle and multiplying that vector with the beamforming matrix of that frequency. The result is again the 2×1 HRTF vector.

In some embodiments the HRTF determiner 833 simply selects the nearest HRTF from the available HRTF data points.

In some embodiments the early part renderer 307 comprises a target covariance matrix determiner 805. The target covariance matrix determiner 805 is configured to receive the spatial metadata 124 which can in this example comprise at least one direction parameter θ(k, n) and at least one direct-to-total energy ratio parameter r(k, n), the overall energy estimate E(k, n) 808, and the HRTF data 336 consisting of the HRTFs h(θ(k, n), k) and the diffuse field covariance matrix $C_D(k)$. The covariance matrix determiner 805 is then configured to determine a target covariance matrix 806 based on the spatial metadata 124, the data 306 and the overall energy estimate 808. For example the target covariance matrix determiner 805 may formulate the target covariance matrix by $$C_y(k, n)=E(k, n)r(k, n)h(\theta(k, n), k)h^H(\theta(k, n), k)+E(k, n)(1-r(k, n))C_D(k)$$

The target covariance matrix $C_y(k, n)$ 806 can then be provided to the mixing rule determiner 809.

The early part renderer 307 in some embodiments comprises a mixing rule determiner 809. The mixing rule determiner 809 is configured to receive the target covariance matrix 806 and the estimated covariance matrix 810. The mixing rule determiner 809 is configured to generate a mixing matrix M(k, n) 812 based on the target covariance matrix $C_y(k, n)$ 806 and the measured covariance matrix $C_x(k, n)$ 810.

In some embodiments the mixing matrix is generated based on a method described in "Optimized covariance domain framework for time-frequency processing of spatial audio", J Vilkamo, T Bäckström, A Kuntz—Journal of the Audio Engineering Society 61, no. 6 (2013): 403-411.

In some embodiments the mixing rule determiner 809 is configured to determine a prototype matrix $$Q = \begin{bmatrix} 1 & 0 \\ 0 & 1 \end{bmatrix}$$

that guides the generation of the mixing matrix.

In summary a mixing matrix M(k, n) may be provided that when applied to a signal with a covariance matrix $C_x(k, n)$ it produces a signal with covariance matrix $C_y(k, n)$, in a least-squares optimized way. Matrix Q guides the signal content in such mixing, and in this example that matrix is simply the identity matrix, since the left and right processed signals should resemble as much as possible the original left and right signals. In other words, the design is to minimally alter the signals while obtaining $C_y(k, n)$ for the processed output. The mixing matrix M(k, n) is formulated for each frequency band k and is provided to the mixer 811. In some embodiments where head tracking is involved the matrix Q can be adapted based on the head orientation. For example, when the user turns 180 degrees, then matrix Q can be zeros at the diagonal, and ones at the non-diagonal. This means in practice that the left output channel should resemble as much as possible the original right channel (in that situation of 180 degrees head turning), and vice versa.

The early part renderer 307 in some embodiments comprises a mixer 811. The mixer 811 receives the time-frequency audio signals 802 and the mixing matrices 812. The mixer 811 is configured to process the time-frequency audio signals (input signal) in each frequency bin b to generate two processed (early part) time-frequency signals 814. This may, for example be formed based on the following expression:

$$y(b, n) = \begin{bmatrix} y_1(b, n) \\ y_2(b, n) \end{bmatrix} = M(k, n)x(b, n)$$

where band k is the band where bin b resides.

The above procedure assumes that the input signals x(b, n) have suitable incoherence between them to render an output signal y(b, n) with the desired target covariance matrix properties. In some situations the input signal does not have suitable inter-channel incoherence, for example, when there is only a single channel transport signal, or the signals are otherwise highly correlated. Therefore in some embodiments decorrelating operations are implemented to generate decorrelated signals based on x(b, n), and to mix the decorrelated signals into a particular residual signal that is added to the signal y(b, n) in the above equation. The procedure of obtaining such a residual signal is known, and for example has been described in the above reference article.

The processed binaural (early part) time-frequency signal y(b, n) 814 is provided to an inverse T/F transformer 813.

In some embodiments the early part renderer 307 comprises an inverse T/F transformer 813 configured to receive the binaural (early part) time-frequency signal y(b, n) 814 and apply an inverse time-frequency transform corresponding to the applied time-frequency transform applied by the T/F transformer 801. The output of the inverse T/F transformer 813 is a binaural (early part) signal 308 which is passed to the combiner 311 (such as shown in FIG. 3).

When the combined late part rendering data 312 is only an indication that no late part response exists, then the late part renderer 309 is configured to generate the binaural late part signal 310 using a default binaural late part response. For example, the late part renderer 309 can generate a pair of white noise responses processed to have a binaural diffuse-field inter-aural correlation, and a decay time and a spectrum according to pre-defined settings corresponding to a typical listening room. Each of the aforementioned parameters may be defined as a function of frequency. In some embodiments, these settings may be user-definable.

The late part render 309 in some embodiments may also receive an indication that determines if the late part rendering should be rendered or not. If no late part rendering is required then the late part renderer 309 provides no output. If a late part rendering is required then the late part renderer 309 is configured to generate and add reverberation according to a suitable method.

For example in some embodiments a convolver is applied to generate a late part binaural output. Several signal processing structures are known to perform convolution. The convolution can be applied efficiently using FFT convolution or partial FFT convolution, for example using Gardner, William G. "Efficient convolution without input/output delay." In Audio Engineering Society Convention 97. Audio Engineering Society, 1994.

In some embodiments the late part renderer 309 may receive (from the late part rendering data combiner 305) late part BRIR responses from many directions. At least the following procedures to select a BRIR pair for rendering is an option. For example in some embodiments the transport audio signals are summed to a single channel to be processed with one pair of reverberation responses. As in a typical set of BRIRs there are responses from several directions, the response may be selected as one of the response pairs in the set, such as the center front BRIR tail. The reverberation response could also be a combined (e.g., averaged) response based on BRIRs from multiple directions. In some embodiments the transport audio channels (for example two channels) are processed with different pairs of reverberation responses. The results of the convolutions are summed together (left and right ear outputs separately) to obtain a two-channel binaural late part output. In this example of two transport channels, the reverberation response for the left-side transport signal could be selected for example from the 90-degrees left BRIR (or the closest available response), and correspondingly to the right side. In this case also, the reverberation responses could also be a combined (e.g., averaged) based on BRIRs from multiple directions.

The binaural late-part signal can then be provided to the combiner 311 block.

The synthesis processor can in some embodiments comprise a combiner 311 configured to receive the binaural early part signal 308 from the early part renderer 307 and binaural later part signal 310 from the late part renderer 309 and combine or sum these together (for the left and right channels separately). This signal may be reproduced over headphones.

Figure 4:
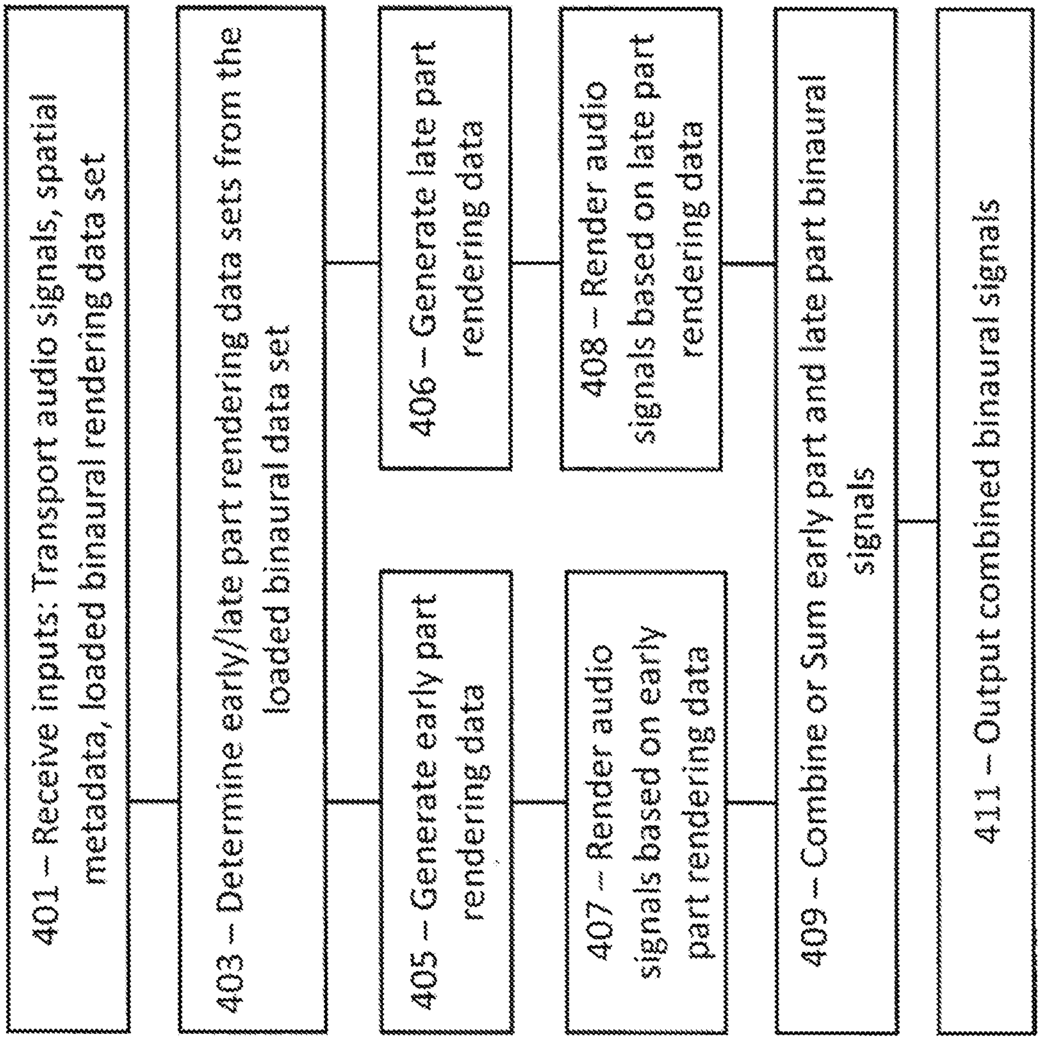
FIG. 4 shows a flow diagram of the operation of the example apparatus as shown in FIG. 3 according to some embodiments

With respect to FIG. 4 a flow diagram showing the operation of the synthesis processor is shown.

The flow diagram shows the operation of receiving inputs such as the transport audio signals, spatial metadata, and loaded binaural rendering data set shown in FIG. 4 by step 401.

Furthermore the method comprises determining early/late part rendering data sets from the loaded binaural rendering data set as shown in FIG. 4 by step 403.

The generation of early part rendering data based on the determined loaded early part rendering data and the pre-determined early part rendering data is shown in FIG. 4 by step 405.

The generation of late part rendering data based on the determined loaded late part rendering data and the pre-determined late part rendering data is shown in FIG. 4 by step 406.

There can further be a binaural rendering based on the early part rendering data, and the transport audio signals and spatial metadata as shown in FIG. 4 by step 407.

Additionally there can be a binaural rendering based on the late part rendering data, and the transport audio signals (and optionally late rendering control signals) as shown in FIG. 4 by step 408.

The early and late rendering signals may then be combined or summed as shown in FIG. 4 by step 409.

The combined binaural audio signals may then be output as shown in FIG. 4 by step 411.

In the above, an example situation was described where the binaural rendering data sets consist of responses from a set of directions. Although this is a typical form, the binaural data can be in other forms as well. For example the rendering data (pre-defined and/or loaded) can be in spherical harmonic domain. For example, it is known that it is possible to approximate a HRTF data set as filters or complex-valued spherical harmonic coefficients. When an Ambisonic signal is processed with such filters or gains, then the result is a binauralized audio signal. In such embodiments when the loaded binaural rendering data is in spherical harmonic domain, it does not correspond to any discrete set of directions. In other words, the considerations of density are not relevant anymore. However, if there are other quality issues at that loaded rendering data set (e.g. noise), it can be replaced with the pre-defined rendering data, and the perceptual matching procedures as described previously can be used.

In some embodiments the pre-defined early part rendering data is stored in the spherical harmonic domain (e.g., $3^{rd}$ or $4^{th}$ order Ambisonic domain). This is because such a data set can be used both for rendering Ambisonic audio to binaural output and for determining HRTFs for any angle. When the user then loads a personalized HRIRs or BRIRs to the system (e.g., a sparse set), then the following steps can be taken to determine the combined early part rendering data:

Firstly determining, based on the pre-defined (spherical harmonic domain) rendering data, a set of HRTFs, for example a spherically equispaced HRTF data set.

Secondly performing the combining and perceptual matching procedures as described above.

Thirdly converting the resulting combined early part rendering data set back to the spherical harmonic domain, for example by finding such spherical harmonic gains that in a least-squares sense approximate the combined early part rendering data set.

The rendering data may be stored in a parameterized form, i.e., not as responses in any domain. For example, it may be stored in a form of left and right ear energies and inter-aural time differences at a set of directions. In this case, the parametrized form can be straightforwardly converted to HRTFs, and all previously exemplified procedures can be applied. Also the late part rendering data can be parametrized, e.g., as reverberation times and spectra as a function of frequency.

The concept as discussed in detail herein shows how to generate a dense data set even if the loaded data set is spatially sparse. At the rendering stage, then when a sound is needed to be rendered into a particular angle, the system can do one of the following:

Select the nearest response from the combined early data set (if a particularly dense early data set has been generated);

Interpolate between the nearest data points using any known method, e.g.;

Formulating a weighted average of responses (in time or frequency domain) over the nearest data points, as if performing amplitude panning;

Interpolating between the data points in a parametric way, e.g., by interpolating energies and ITDs separately; and Using the early rendering data in the spherical harmonic domain (SHD), which inherently means also interpolation to any direction.

In some embodiments the combined binaural rendering data sets created with the present invention may be stored or used in any domain, such as in the spherical harmonic domain (SHD), time domain, frequency domain, and/or parametric domain.

In the examples discussed herein an example situation was described where the late part rendering was based on late part responses and convolutions. However, there are numerous existing reverberator structures that perform reverberation in a more efficient manner, for example:

A feedback delay network (FDN) may be implemented. The FDN is a reverberator signal processing structure that circulates a signal in multiple interconnected feedback loops and outputs a late reverberation;

The reverberator in Vilkamo, J., Neugebauer, B. and Plogsties, J., 2012. *Sparse frequency-domain reverberator. Journal of the Audio Engineering Society,* 59(12), pp. 936-943, uses a simpler loop-structure than that of FDN, but with a large number of frequency bands.

Any reverberator that can produce two substantially incoherent reverberation responses (e.g., either of the above) can be used for generating the binaural late part signals. Typically, the reverberator structure generates substantially incoherent signals, and then these signals are mixed, frequency-dependently, to obtain an inter-aural correlation that is natural for humans in a reverberant sound field. If the late part rendering data is in a form of BRIR late-part responses, it is possible with some reverberators (e.g. one in the above publication) to adjust the reverberation parameters to approximate the BRIR late-part responses. This typically means setting the reverberation times as a function of frequency and spectral gains of the reverberator to match the corresponding features of the BRIR late-part responses.

The combined late part rendering data is in some embodiments typically in a form that is relevant for the particular signal processing structure that the late part renderer uses, for example:

when convolution is used, then the late part rendering data is in a form of responses;

when a reverberator such as described above is used, the late part rendering data is in a form of configuration parameters, such as reverberation times as a function of frequency. Such parameters can be estimated from the reverberation response, if a user loads a BRIR data set to be used in rendering.

In some embodiments, the perceptual matching procedure can be performed during the spatial audio rendering, instead of performing it on the data set.

In this example the mixing matrix is defined based on the input being a two channel transport audio signal. However these methods can be adapted to embodiments for any number of transport audio channels.

It is described above how to use a pre-defined binaural rendering data set along with a loaded binaural rendering data set. This may in some embodiments improve the reproduction quality of binaural rendering according to the loaded binaural rendering data set, by use of the high-quality pre-defined binaural rendering data set.

Although the foregoing descriptions may imply a situation where the processing takes place on a single processing entity (handling the loading of the binaural rendering data sets and the rendering of the binaural audio output) it is understood that the processing can take place on multiple processing entities. For example, the processing may take place on different software modules and/or devices, as some of the processing is offline and some of the processing may be real-time.

Therefore, it is clear for a person skilled in the art that the processing steps can be distributed to more than one different devices or software modules. In one practical example, it is possible to implement some of the processing steps within a first program running on a computer, while other parts of the processing may be implemented in another program, for example an audio processing library running on a separate computer or mobile phone.

The steps related to analysis of binaural rendering data sets may be performed on any suitable platform capable of data visualization and thus able to detect potential errors in any of the response feature estimations.

As a practical example, when using a suitable program to perform part of the processing, the involved steps could include the following: A set of binaural room impulse responses (BRIRs) is loaded into the program; In the program, the BRIR data set is divided into early and late parts; In the program, the spectral information of the early and the late parts are estimated; In the program, the reverberation times (e.g. average of the BRIR set) as a function of frequency are estimated; The spectral information and reverberation times are exported from the program and incorporated to an audio processing software module, where the software module has a pre-defined HRTF data set and a configurable reverberator; The audio processing software is enabled to use the spectral information to alter the spectrum of the processing based on the pre-defined HRTF data set; The audio processing software is enabled to use the reverberation times (and the spectral information) to configure the reverberator; The software is compiled and run for example on a mobile phone and it is thus enabled to render a binaural audio with a room effect where the room effect is based on the loaded BRIR data set, however, by using also the pre-defined HRTF data set.

In the above, the "combined binaural data set" thus consists of the pre-defined HRTF data set, spectral information retrieved based on the loaded BRIR data set, and reverberation parameters retrieved based on the loaded BRIR data set. As shown by this example above, it is understood that a person skilled in the art is able to distribute the processing to various platforms in various ways.

Figure 9:
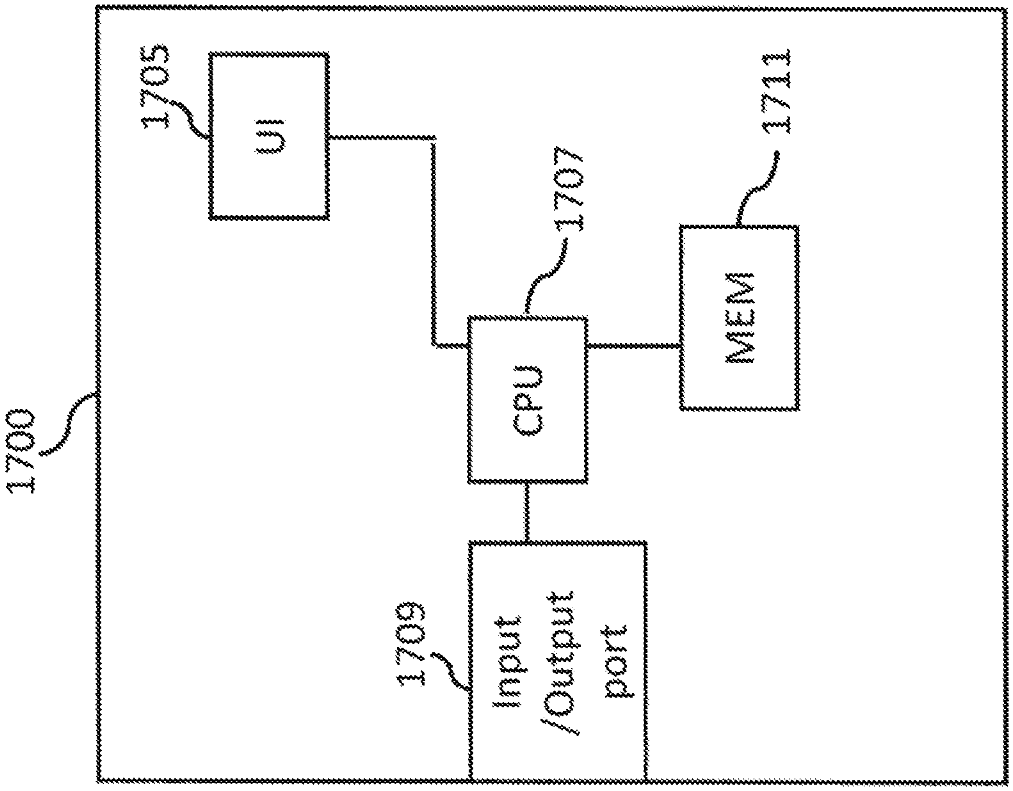
FIG. 9 shows an example device suitable for implementing the apparatus shown in previous figures.

With respect to FIG. 9 an example electronic device which may be used as any of the apparatus parts of the system as described above. The device may be any suitable electronics device or apparatus. For example in some embodiments the device 1700 is a mobile device, user equipment, tablet computer, computer, audio playback apparatus, etc. The device may for example be configured to implement the encoder/analyser part 101 or the decoder/synthesizer part 105 as shown in FIG. 1 or any functional block as described above.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals.

In some embodiments the device 1700 may be employed as at least part of the synthesis device. The input/output port 1709 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor, and at least one memory storing instructions that, when executed with the at least one processor, cause the apparatus at least to:

obtain a spatial audio signal comprising at least one audio signal and spatial metadata associated with the at least one audio signal;

obtain at least one data set related to binaural rendering;

obtain at least one pre-defined data set related to binaural rendering;

determine at least one combined data set comprising at least part of the at least one data set and at least part of the at least one pre-defined data set; and generate a binaural audio signal based on a combination of at least part of:

the at least one combined data set;

the spatial metadata; and the at least one audio signal.

2. The apparatus as claimed in claim 1, wherein the at least one data set related to binaural rendering comprises at least one of:

a set of binaural room impulse responses or transfer functions;

a set of head related impulse responses or transfer functions;

a data set based on binaural room impulse responses or transfer functions; or a data set based on head related impulse responses or transfer functions.

3. The apparatus as claimed in claim 1, wherein the at least one pre-defined data set related to binaural rendering comprises at least one of:

a set of pre-defined binaural room impulse responses or transfer functions;

a set of pre-defined head related impulse responses or transfer functions;

a pre-defined data set based on binaural room impulse responses or transfer functions; or a pre-defined data set based on captured head related impulse responses or transfer functions.

4. The apparatus as claimed in claim 1, wherein the instructions, when executed with the at least one processor, cause the apparatus to:

divide the at least one data set into a first part and a second part; and generate a first combination based on the first part of the at least one data set and the at least one pre-defined data set.

5. The apparatus as claimed in claim 4, wherein generating the binaural audio signal comprises the instructions, when executed with the at least one processor, cause the apparatus to:

generate a first part binaural audio signal based on the first combination and the spatial audio signal.

6. The apparatus as claimed in claim 4, wherein the instructions, when executed with the at least one processor, cause the apparatus to:

generate a second combination based on one of:

the second part of the at least one data set and at least part of the at least one pre-defined data set;

the at least part of the at least one pre-defined data set where the second part of the at least one data set is a null set; or the at least part of the at least one pre-defined data set where the second part of the at least one data set is determined to substantially at least one of: have an error; be noisy; or be corrupted.

7. The apparatus as claimed in claim 6, wherein generating the binaural audio signal comprises the instructions, when executed with the at least one processor, cause the apparatus to:

generate a second part binaural audio signal based on the second combination and the spatial audio signal.

8. The apparatus as claimed in claim 5, wherein generating the binaural audio signal comprises the instructions, when executed with the at least one processor, cause the apparatus to:

generate the binaural audio signal based on a combination of the first part binaural audio signal and a second part binaural audio signal, wherein the second part binaural audio signal is based, at least partially, on the spatial audio signal.

9. The apparatus as claimed in claim 4, wherein the instructions, when executed with the at least one processor, cause the apparatus to:

generate a first window function based on an offset time from a time of determined maximum energy, wherein the first window function is applied to the at least one data set to generate the first part; and generate a second window function based on the offset time from the time of determined maximum energy, wherein the second window function is applied to the at least one data set to generate the second part.

10. The apparatus as claimed in claim 1, wherein determining the at least one combined data set comprises the instructions, when executed with the at least one processor, cause the apparatus to:

generate an initial combined data set based on a selection of the at least one data set;

determine at least one gap within the initial combined data set defined with at least one pair of adjacent elements of the initial combined data set with a directional difference greater than a determined threshold; and for a gap of the at least one gap:

identify within the at least one pre-defined data set an element of the at least one pre-defined data set with a direction located within the gap; and combine the identified element of the at least one pre-defined data set and the initial combined data set.

11. The apparatus as claimed in claim 10, wherein the determined threshold comprises:

an azimuth threshold; and an elevation threshold.

12. The apparatus as claimed in claim 1, wherein the at least one combined data set is defined over a range of directions, and wherein over the range of directions the at least one combined data set comprises no directional gaps greater than a threshold.

13. The apparatus as claimed in claim 1, wherein the instructions, when executed with the at least one processor, cause the apparatus to at least one of:

receive the spatial audio signal from a further apparatus to obtain the spatial audio signal comprising the at least one audio signal and the spatial metadata associated with the at least one audio signal; or receive the at least one data set from the further apparatus to obtain the at least one data set related to binaural rendering.

14. A method comprising:

obtaining a spatial audio signal comprising at least one audio signal and spatial metadata associated with the at least one audio signal;

obtaining at least one data set related to binaural rendering;

obtaining at least one pre-defined data set related to binaural rendering;

determining at least one combined data set comprising at least part of the at least one data set and at least part of the at least one pre-defined data set; and generating a binaural audio signal based on a combination of:

the at least one combined data set;

the spatial metadata; and the at least one audio signal.

15. The method as claimed in claim 14, wherein the method further comprises:

dividing the at least one data set into a first part and a second part; and generating a first combination based on the first part of the at least one data set and the at least one pre-defined data set.

16. The method as claimed in claim 15, wherein generating the binaural audio signal comprises:

generating a first part binaural audio signal based on the first combination and the spatial audio signal.

17. The method as claimed in claim 15, further comprising:

generating a second combination based on one of:

the second part of the at least one data set and at least part of the at least one pre-defined data set;

the at least part of the at least one pre-defined data set where the second part of the at least one data set is a null set; or the at least part of the at least one pre-defined data set where the second part of the at least one data set is determined to substantially at least one of: have an error; be noisy; or be corrupted.

18. The method as claimed in claim 17, wherein generating the binaural audio signal comprises:

generating a second part binaural audio signal based on the second combination and the spatial audio signal.

19. The method as claimed in claim 16, wherein generating the binaural audio signal comprises:

generating the binaural audio signal based on a combination of the first part binaural audio signal and a second part binaural audio signal, wherein the second part binaural audio signal is based, at least partially, on the spatial audio signal.

20. A non-transitory computer-readable medium comprising instructions stored thereon for performing at least operations comprising the method as claimed in claim 14.

* * * * *